United States Patent
Tahara

(10) Patent No.: US 12,298,218 B2
(45) Date of Patent: May 13, 2025

(54) PARTICLE DETECTION APPARATUS, INFORMATION PROCESSING APPARATUS, INFORMATION PROCESSING METHOD, AND PARTICLE DETECTION METHOD

(71) Applicant: Sony Group Corporation, Tokyo (JP)

(72) Inventor: Katsutoshi Tahara, Tokyo (JP)

(73) Assignee: Sony Group Corporation, Tokyo (JP)

( * ) Notice: Subject to any disclaimer, the term of this patent is extended or adjusted under 35 U.S.C. 154(b) by 458 days.

(21) Appl. No.: 17/765,799

(22) PCT Filed: Oct. 7, 2020

(86) PCT No.: PCT/JP2020/037949
§ 371 (c)(1),
(2) Date: Mar. 31, 2022

(87) PCT Pub. No.: WO2021/070847
PCT Pub. Date: Apr. 15, 2021

(65) Prior Publication Data
US 2022/0404260 A1    Dec. 22, 2022

(30) Foreign Application Priority Data
Oct. 10, 2019    (JP) ................................. 2019-186782

(51) Int. Cl.
*G01N 15/1429*    (2024.01)
*G01N 21/64*    (2006.01)

(52) U.S. Cl.
CPC ..... *G01N 15/1429* (2013.01); *G01N 21/6428* (2013.01); *G01N 21/6486* (2013.01)

(58) Field of Classification Search
CPC .......... G01N 15/1429; G01N 21/6428; G01N 21/6486
See application file for complete search history.

(56) References Cited

U.S. PATENT DOCUMENTS 6,275,777 B1 *  8/2001  Shimizu ................ G06T 7/0012
                                                  702/179
6,798,452 B1 *  9/2004  Kuroda ................ H04N 25/672
                                                  358/463
(Continued)

FOREIGN PATENT DOCUMENTS

JP    2003-083894 A    3/2003
WO    WO 2017/126170 A1    7/2017
WO    WO-2019049442 A1    3/2019

OTHER PUBLICATIONS

International Search Report mailed Jan. 22, 2021 in connection with International Application No. PCT/JP2020/037949.
(Continued)

*Primary Examiner* — Jennifer D Bennett
*Assistant Examiner* — Erin R Garber
(74) *Attorney, Agent, or Firm* — Wolf, Greenfield & Sacks, P.C.

(57) ABSTRACT

A particle detection apparatus is provided that includes: a plurality of optical detectors configured to detect light from a particle, wherein at least one of optical detectors has an applied voltage coefficient different from other optical detectors; and a processor including a processing device and a memory storing instructions that, when executed by the processing device, cause the processor to: correct optical data obtained from the particle in accordance with differentiation between applied voltage coefficients of the plurality of optical detectors and a predetermined applied voltage coefficient.

16 Claims, 14 Drawing Sheets

(56) References Cited

U.S. PATENT DOCUMENTS

| | | | | |
|---|---|---|---|---|
| 2008/0304055 A1* | 12/2008 | Oshima | ............ | G01N 21/9501 |
| | | | | 356/237.5 |
| 2010/0015611 A1* | 1/2010 | Webster | ............ | G01N 21/6428 |
| | | | | 435/6.1 |
| 2019/0011348 A1* | 1/2019 | Tahara | ............... | G01N 15/1012 |
| 2020/0182772 A1* | 6/2020 | Umetsu | ............ | G01N 15/1434 |

OTHER PUBLICATIONS

International Search Report and Written Opinion mailed Jan. 22, 2021 in connection with International Application No. PCT/JP2020/037949.

International Preliminary Report on Patentability mailed Apr. 21, 2022 in connection with International Application No. PCT/JP2020/037949.

* cited by examiner

PARTICLE DETECTION APPARATUS, INFORMATION PROCESSING APPARATUS, INFORMATION PROCESSING METHOD, AND PARTICLE DETECTION METHOD

CROSS-REFERENCE TO RELATED APPLICATIONS

This application claims the benefit of under 35 U.S.C. § 371 as a U.S. National Stage Entry of International Application No. PCT/JP2020/037949, filed in the Japanese Patent Office as a Receiving Office on Oct. 7, 2020, which claims priority to Japanese Priority Patent Application JP 2019-186782, filed on in the Japanese Patent Office on Oct. 10, 2019, each of which is hereby incorporated by reference in its entirety.

TECHNICAL FIELD

The present technology relates to a particle detection apparatus. More specifically, the present technology relates to an information processing apparatus, a particle detection apparatus, an information processing method, and a particle detection method that are used in optically detecting characteristics of a particle.

BACKGROUND ART

In recent years, as a result of improvements in an analysis technique, a technique for causing biological microparticles such as cells or microorganisms, microparticles such as microbeads, or the like to flow in a flow passage, and for individually detecting particles or the like, or analyzing or sorting the detected particles or the like in a flowing process is under development.

As a representative example of such a technique for analyzing or sorting particles, an analysis technique called flow cytometry is rapidly being technically improved. Flow cytometry is an analysis technique for analyzing or sorting particles by causing particles to be analyzed to flow in a state where the particles are aligned in fluid and irradiating the particles with a laser beam or the like to detect fluorescence or scattered light that has been emitted from each of the particles.

For example, in a case where the fluorescence of a cell is detected, a cell labeled with a fluorochrome is irradiated with excitation light having an appropriate wavelength and intensity, such as a laser beam. Then, fluorescence emitted from the fluorochrome is condensed by using a lens or the like, light in an appropriate wavelength range is selected by using a wavelength selection element such as a filter or a dichroic mirror, and the selected light is detected by using a light-receiving element such as a photo-multiplier tube (PMT). At this time, by combining a plurality of wavelength selection elements and a plurality of light-receiving elements, rays of fluorescence from a plurality of fluorochromes with which cells have been labeled can also be simultaneously detected and analyzed. Moreover, by combining rays of excitation light that have a plurality of wavelengths, the number of analyzable fluorochromes can also be increased.

Examples of a method for detecting fluorescence in flow cytometry include a method for selecting a plurality of rays of light in discontinuous wavelength ranges by using a wavelength selection element such as a filter and detecting the intensity of light in each of the wavelength ranges, and a method for detecting the intensity of light in a continuous wavelength range as a fluorescence spectrum. In spectrum type flow cytometry that enables the detection of a fluorescence spectrum, fluorescence emitted from a particle is spectrally dispersed by using a spectral element such as a prism or a grating. Then, the spectrally dispersed fluorescence is detected by using a light-receiving element array obtained by arranging a plurality of light-receiving elements that is different in a detection wavelength range. As the light-receiving element array, a PMT array or a photodiode array obtained by one-dimensionally arranging light-receiving elements such as PMTs or photodiodes, or an array obtained by arranging a plurality of independent detection channels such as two-dimensional light-receiving elements, e.g., CCDs or CMOS's, is used.

In particle analysis that is represented by flow cytometry or the like, an optical technique for irradiating particles to be analyzed with light of a laser or the like and detecting fluorescence or scattered light that has been emitted from a particle is frequently used. Then, a histogram is extracted on the basis of detected optical data by using a computer for analysis and software, and analysis is performed.

In the optical analysis of particles, in some cases, before the optical detection of particles serving as actual targets to be inspected, quality control (QC) is performed for the purpose of verifying the precision or the like of the optical detection, confirming and normalizing an operation of a device, or the like. In this quality control, normally, a plurality of beads labeled with fluorochromes that have fluorescent intensities different from each other (for example, 3-peak beads, 6-peak beads, 8-peak beads, or the like), one type of beads from which a wide-range spectrum is obtained (for example, align check beads or ultra rainbow fluorescent particles), or the like are used.

As a technology for performing fluorescence compensation in detection among a plurality of fluorochromes, for example, PTL 1 discloses a technology in which, by developing a program for calculating a centroid value of a fluorescence group relating to fluorescence-labeled cells to be tested from a two-dimensional correlation diagram of the fluorescence-labeled cells to be tested, the two-dimensional correlation diagram having been obtained by a flow cytometer, and for performing correction calculation on fluorescence values of the fluorescence-labeled cells to be tested that correspond to the centroid value by using the fluorescence values and a predetermined determinant, fluorescence compensation can be performed among a plurality of fluorochromes or in detecting fluorescence by using a plurality of laser beams, and fluorescence compensation can be performed without the repreparation of samples even after processing for detecting cells to be tested has been finished.

CITATION LIST

Patent Literature

PTL 1: JP 2003-83894A
PTL 2: WO2017/126170A1

SUMMARY

Technical Problem

A optical detector such as a PMT has a difference in sensitivity on an individual basis, and even if the same optical detector is used, a difference in sensitivity is generated over time. One example of the cause for this difference in sensitivity is a variation in the sensitivity of an optical detector. In some cases, a variation in sensitivity changes by several tens of times or more due to an individual difference or the lapse of time, even if the same voltage value is set. This is directly and dominantly reflected in a difference in an output level of a device. Therefore, even if the same setting is performed among devices or even if the same setting as setting in previous detection is performed in a device, a difference in an output level is generated.

Accordingly, for example, in PTL 2, by using an applied voltage coefficient that corresponds to a feature amount of a predetermined output pulse, a difference among the levels of outputs from detection units that have been set to have the same applied voltage coefficient can be precisely corrected. However, this technology is a method for collectively changing the applied voltage coefficients of all of the detectors, and there has been a request for further improvements.

Accordingly, it is desirable that the present technology principally provide a technology for precisely correcting a difference among output levels from detection units that have been set to be different in an applied voltage coefficient.

Solution to Problem

According to the present technology, first, there is provided a particle detection apparatus comprises that a plurality of optical detectors configured to detect light from a particle, wherein at least one of optical detectors has an applied voltage coefficient different from other optical detectors; and
  a processor including a processing device and a memory storing instructions that, when executed by the processing device, cause the processor to: correct optical data obtained from the particle in accordance with differentiation between applied voltage coefficients of the plurality of optical detectors and a predetermined applied voltage coefficient.

According to the present technology, next, there is provided an information processing apparatus comprising: a processor including a processing device and a memory storing instructions that, when executed by the processing device, cause the processor to: correct optical data of light detected from a particle by a plurality of optical detectors in accordance with differentiation between applied voltage coefficients of the plurality of optical detectors and a predetermined applied voltage coefficient, wherein at least one of optical detectors has an applied voltage coefficient different from other optical detectors.

According to the present technology, there is further provided an information processing method comprising: correcting optical data of light detected from a particle by a plurality of optical detectors in accordance with differentiation between applied voltage coefficients of the plurality of optical detectors and a predetermined applied voltage coefficient, wherein at least one of optical detectors has an applied voltage coefficient different from other optical detectors.

According to the present technology, there is also provided a particle detection method comprising: detecting light from a particle, wherein at least one of optical detectors has an applied voltage coefficient different from other optical detectors; correcting optical data obtained from the particle in accordance with differentiation between applied voltage coefficients of the plurality of optical detectors and a predetermined applied voltage coefficient.

In the present technology, it is assumed that a "particle" includes a wide range including an organism-related microparticle such as a cell, a microorganism, or a liposome, a synthetic particle such as a latex particle, a gel particle, or an industrial particle, and the like.

The organism-related microparticle includes a chromosome, a liposome, a mitochondrion, an organelle, and the like that configure various cells. The cell includes an animal cell (for example, a blood cell and the like) and a plant cell. The microorganism includes bacteria such as *Escherichia coli*, viruses such as tobacco mosaic virus, fungi such as yeast, and the like. Moreover, the organism-related microparticle may also include an organism-related polymer such as nucleic acid, protein, or a composite of nucleic acid and protein. Furthermore, the industrial particle may be, for example, an organic or inorganic polymer material, metal, or the like. The organic polymer material includes polystyrene, styrene-divinylbenzene, polymethyl methacrylate, and the like. The inorganic polymer material includes glass, silica, a magnetic material, and the like. Metal includes gold colloid, aluminum, and the like. The shapes of these particles are generally spherical. However, in the present technology, the shapes of these particles may be aspherical, and a size, mass, and the like of each of these particles are not particularly limited.

DESCRIPTION OF EMBODIMENTS

Figure 1:
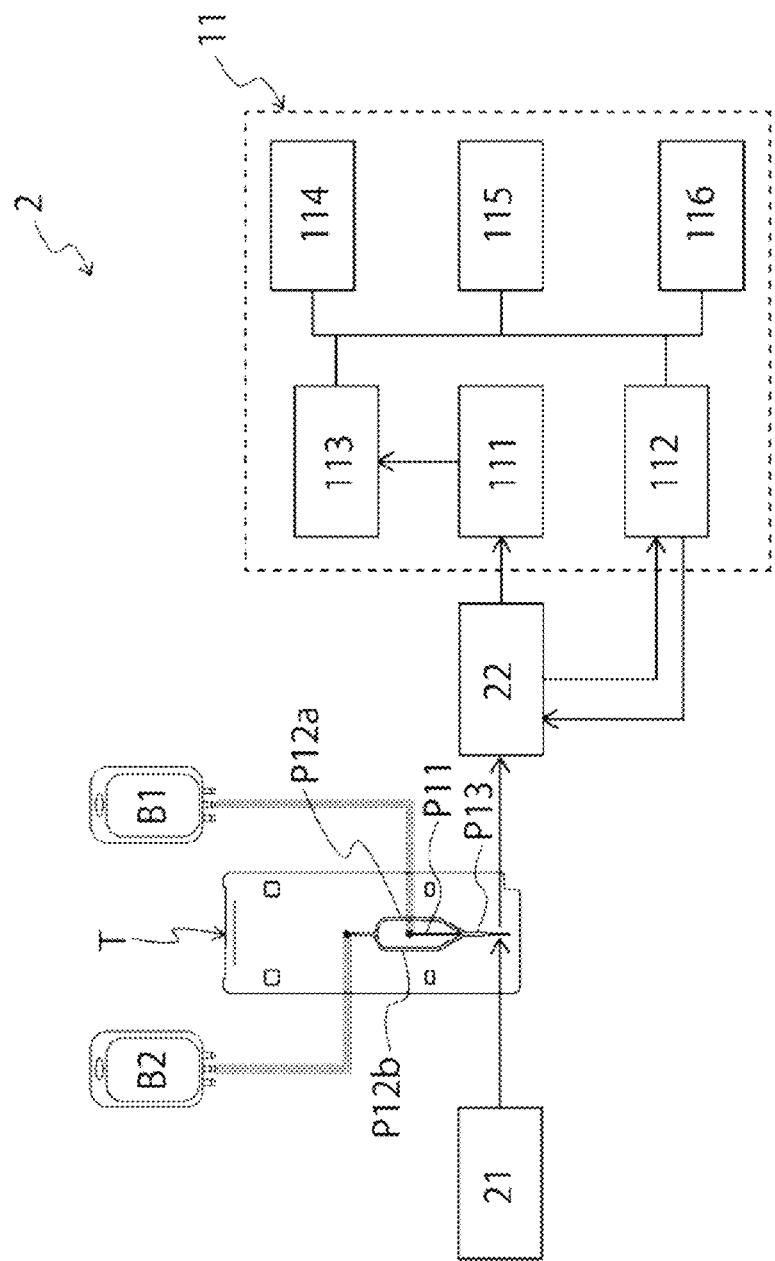
FIG. 1 is a schematic conceptual diagram schematically illustrating a first embodiment of a particle detection apparatus 2 that can use an information processing apparatus 1 according to the present technology.

Preferred embodiments of the present technology are described below with reference to the drawings. Embodiments described below indicate examples of a representative embodiment of the present technology, and are not to be construed as limitations of the scope of the present technology. Note that description will be provided in the order described below.

1. Information processing apparatus 1, particle detection apparatus 2, and particle detection system 3
   (1) Flow passage P
   (2) Light irradiation unit 21
   (3) Optical detection unit 22
   (4) Information processing apparatus 1 (information processing unit 11)
   (4-1) Correction unit 111
   (4-2) Setting unit 12 (112)
   (4-3) Fluorescence separation processing unit 13 (113)
   (4-4) Storage 14 (114)
   (4-5) Display unit 15 (115)
   (4-6) User interface 16 (116)
   (5) Sorting unit 23
2. Information processing method and particle detection method
3. Computer program <1. Information Processing Apparatus 1, Particle Detection Apparatus 2 and Particle Detection System 3>

An information processing apparatus 1 according to the present technology is an apparatus that processes a detected optical data in detecting fluorescence emitted from a particle in sample liquid that flows in a flow passage P, and includes at least a correction unit 111. Furthermore, a setting unit 12, a fluorescence separation processing unit 13, a storage 14, a display unit 15, a user interface 16, and the like can be included, as necessary.

Figure 2:
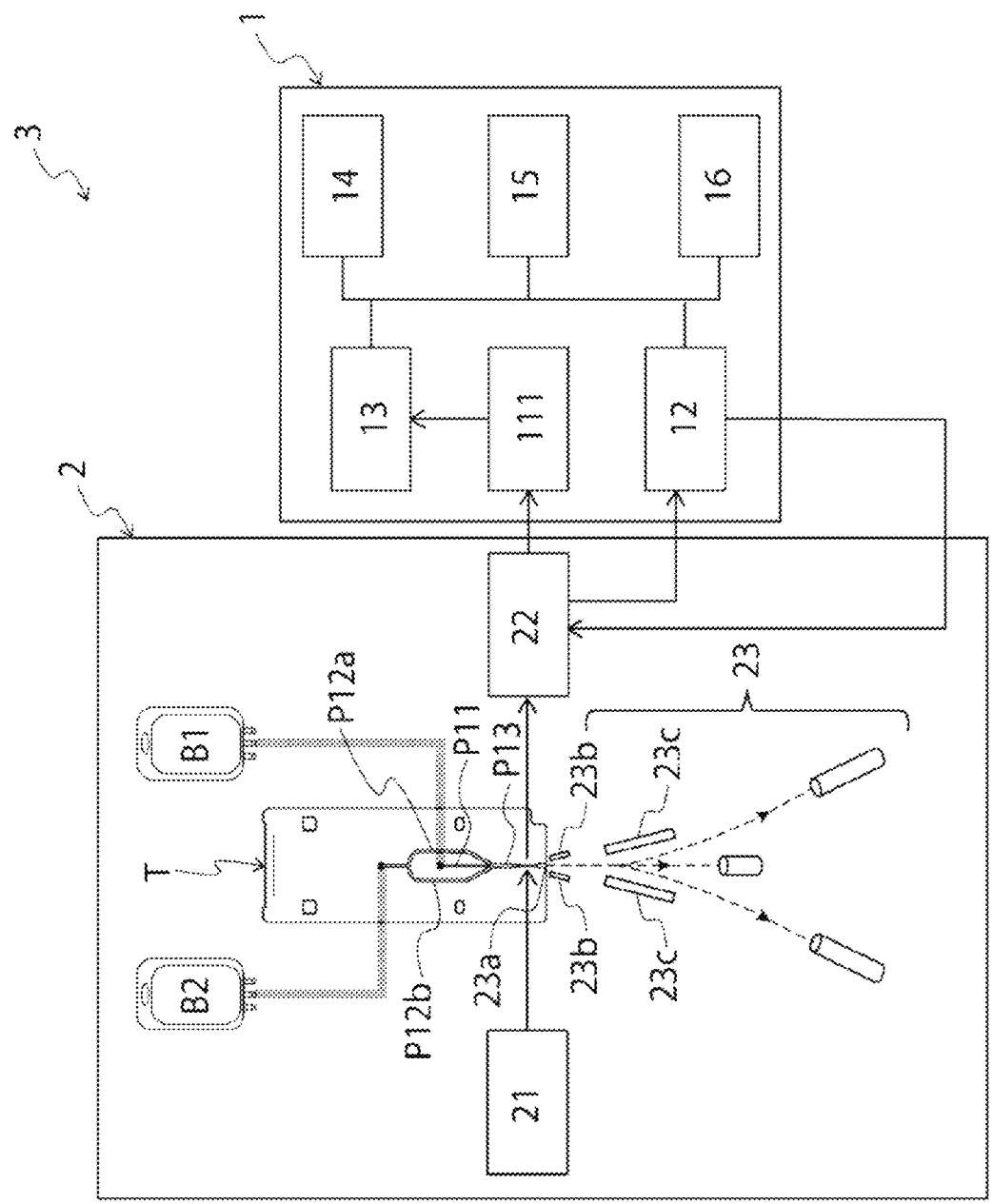
FIG. 2 is a schematic conceptual diagram schematically illustrating a first embodiment of a particle detection system 3 that can use the information processing apparatus 1 according to the present technology.
Figure 3:
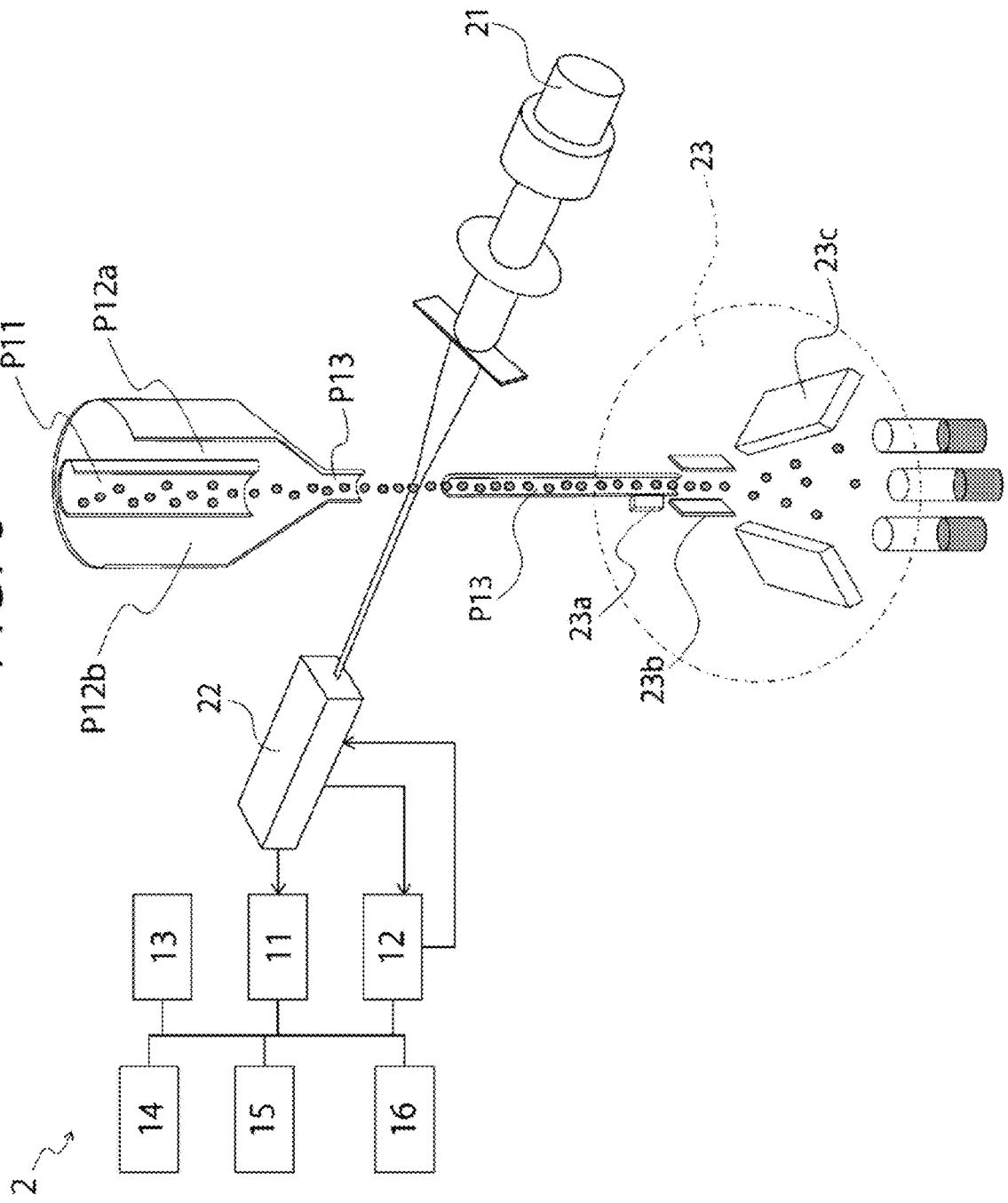
FIG. 3 is a schematic conceptual diagram schematically illustrating a second embodiment of the particle detection apparatus 2 that can use the information processing apparatus 1 according to the present technology.
Figure 4:
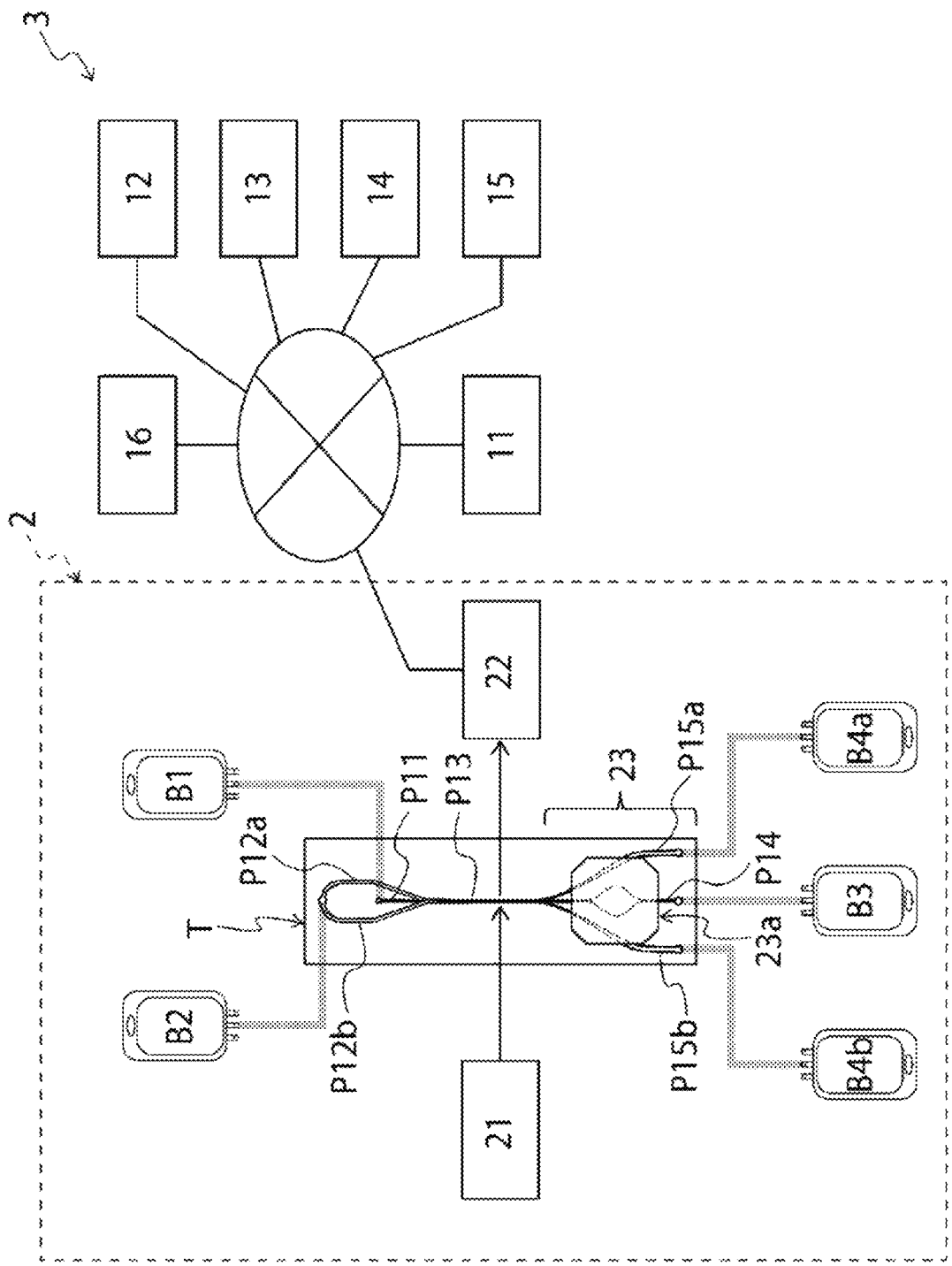
FIG. 4 is a schematic conceptual diagram schematically illustrating a second embodiment of the particle detection system 3 that can use the information processing apparatus 1 according to the present technology.

FIG. 1 is a schematic conceptual diagram schematically illustrating a first embodiment of a particle detection apparatus 2 that can use the information processing apparatus 1 according to the present technology. FIG. 2 is a schematic conceptual diagram schematically illustrating a first embodiment of a particle detection system 3 that can use the information processing apparatus 1 according to the present technology. FIG. 3 is a schematic conceptual diagram schematically illustrating a second embodiment of the particle detection apparatus 2 that can use the information processing apparatus 1 according to the present technology. FIG. 4 is a schematic conceptual diagram schematically illustrating a second embodiment of the particle detection system 3 that can use the information processing apparatus 1 according to the present technology. The particle detection apparatus 2 and a particle detection system according to the present technology include at least an optical detection unit 22 and an information processing unit 11, and the information processing unit 11 includes at least a correction unit 111. Furthermore, a flow passage P, a light irradiation unit 21, a setting unit 112, a fluorescence separation processing unit 113, a storage 114, a display unit 115, a user interface 116, a sorting unit 23, and the like can be included, as necessary.

Note that the correction unit 111, the setting unit 12 (112), the fluorescence separation processing unit 13 (113), the storage 14 (114), the display unit 15 (115), the user interface 16 (116), and the like may be provided in the information processing unit 11, as illustrated as the particle detection apparatus 2 according to the first embodiment in FIG. 1. Alternatively, as illustrated in FIG. 2, the particle detection system 3 may include the information processing apparatus 1 that includes the correction unit 111, the setting unit 12, the fluorescence separation processing unit 13, the storage 14, the display unit 15, and the user interface 16, and the particle detection apparatus 2. Furthermore, as illustrated as the particle detection apparatus 2 according to the second embodiment in FIG. 3, the information processing unit 11, the setting unit 12, the fluorescence separation processing unit 13, the storage 14, the display unit 15, and the user interface 16 can be provided independently of each other. Alternatively, as illustrated in FIG. 4, in the particle detection system 3, the information processing unit 11, the setting unit 12, the fluorescence separation processing unit 13, the storage 14, the display unit 15, and the user interface 16 that are independent of each other may be connected with the optical detection unit 22 of the particle detection apparatus 2 via a network.

Moreover, the information processing unit 11 (the correction unit 111), the setting unit 12 (112), the fluorescence separation processing unit 13 (113), the storage 14 (114), and the display unit 15 (115) can be provided in a cloud environment, and can be connected with the particle detection apparatus 2 via a network. More preferably, the correction unit 111 and the setting unit 12 (112) can be provided in the information processing unit 11, and the fluorescence separation processing unit 13 (113), the storage 14 (114), and the display unit 15 (115) can be provided in a cloud environment, and can be connected with the particle detection apparatus 2 via a network. In this case, a record of correction processing performed by the correction unit 111, a record of setting conditions of the setting unit 12 (112), a record of fluorescence separation processing performed by the fluorescence separation processing unit 13 (113), and the like can be stored in the storage 14 (114), and various types of information stored in the storage 14 (114) can be shared by a plurality of users.

Details of respective units are described below along the time series of detection.

(1) Flow Passage P

The particle detection apparatus 2 according to the present technology can analyze or sort particles by detecting optical data obtained from particles that have been aligned in one line in a flow cell (a flow passage P).

The flow passage P may be provided in the particle detection apparatus 2 in advance, or a commercially available flow passage P, a disposable chip provided with a flow passage P, or the like can be provided in the particle detection apparatus 2 to perform analysis or sorting.

A form of the flow passage P is not particularly limited, and can be freely designed. For example, not only a flow passage P that is formed in a two-dimensional or three-dimensional substrate T of plastic, glass, or the like, as illustrated in FIG. 1, FIG. 2, and FIG. 4 but also a flow passage P used in a flow cytometer in related art, as illustrated in FIG. 3, can be used in the particle detection apparatus 2.

Furthermore, a flow passage width, a flow passage depth, and a flow passage sectional shape of the flow passage P are not particularly limited if the flow passage P has a form that enables a laminar flow to be formed, and can be freely designed. For example, a microchannel having a flow passage width of 1 mm or less can also be used in the particle detection apparatus 2. In particular, a microchannel that has a flow passage width ranging from about 10 μm to about 1 mm inclusive can be suitably used in the present technology.

A method for feeding particles is not particularly limited, and particles can be caused to flow in the flow passage P according to a form of the flow passage P to be used. For example, the case of the flow passage P formed in the substrate T illustrated in FIG. 1, FIG. 2, and FIG. 4 is described. Sample liquid including particles is introduced into a sample liquid flow passage P11, and sheath liquid is introduced into each of two sheath liquid flow passages P12a and P12b. The sample liquid flow passage P11 and the sheath liquid flow passages P12a and P12b join each other to form a principal flow passage P13. A sample liquid laminar flow fed into the sample liquid flow passage P11 and sheath liquid laminar flows fed into the sheath liquid flow passages P12a and P12b join each other in the principal flow passage P13, and a sheath flow can be formed in which the sample liquid laminar flow is sandwiched between the sheath liquid laminar flows.

Particles that are caused to flow through the flow passage P can be labeled with one type or two or more types of dyes such as fluorochromes. In this case, examples of a fluorochrome that can be used in the present technology include Cascade Blue, Pacific Blue, fluorescein isothiocyanate (FITC), phycoerythrin (PE), propidium iodide (PI), Texas Red (TR), peridinin chlorophyll protein (PerCP), allophycocyanin (APC), 4',6-Diamidino-2-phenylindole (DAPI), Cy3, Cy5, Cy7, Brilliant Violet (BV421), and the like.

(2) Light Irradiation Unit 21

The particle detection apparatus 2 and the particle detection system 3 according to the present technology can include a light irradiation unit 21. The light irradiation unit 21 irradiates particles that flow through the flow passage P with light. The light irradiation unit 21 may be omitted from the particle detection apparatus 2 according to the present technology, and particles that flow through the flow passage P can be irradiated with light by using an external light irradiation device or the like.

The light irradiation unit 21 can include a plurality of light sources to enable irradiation with rays of excitation light that have wavelengths different from each other.

The type of light emitted from the light irradiation unit 21 is not particularly limited; however, in order to reliably generate fluorescence or scattered light from particles, light in which a light direction, a wavelength, and a light intensity are constant is desirable. Examples include a laser, an LED, and the like. In a case where a laser is used, the type of a laser is not particularly limited. However, lasers of one type or two or more types from among an argon ion (Ar) laser, a helium-neon (He—Ne) laser, a dye laser, a krypton (Cr) laser, a semiconductor laser, a solid-state laser obtained by combining the semiconductor laser and a wavelength conversion optical element, or the like can be freely combined and can be used.

(3) Optical Detection Unit 22

Figure 5:
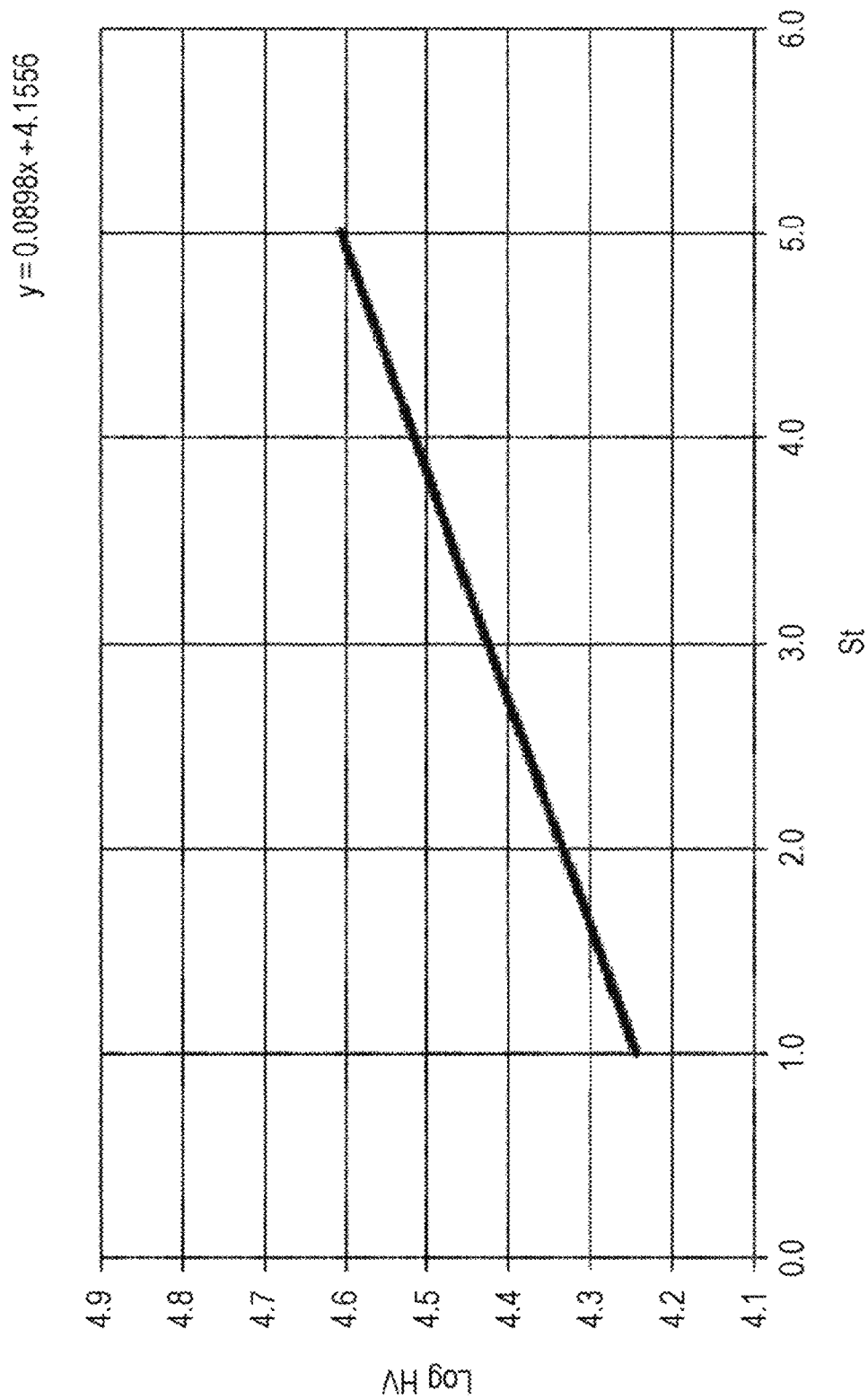
FIG. 5 is a graph substituted for a diagram that illustrates one example of a linear relationship in a case where it is assumed that a vertical axis indicates Log HV and a horizontal axis indicates St.
Figure 6:
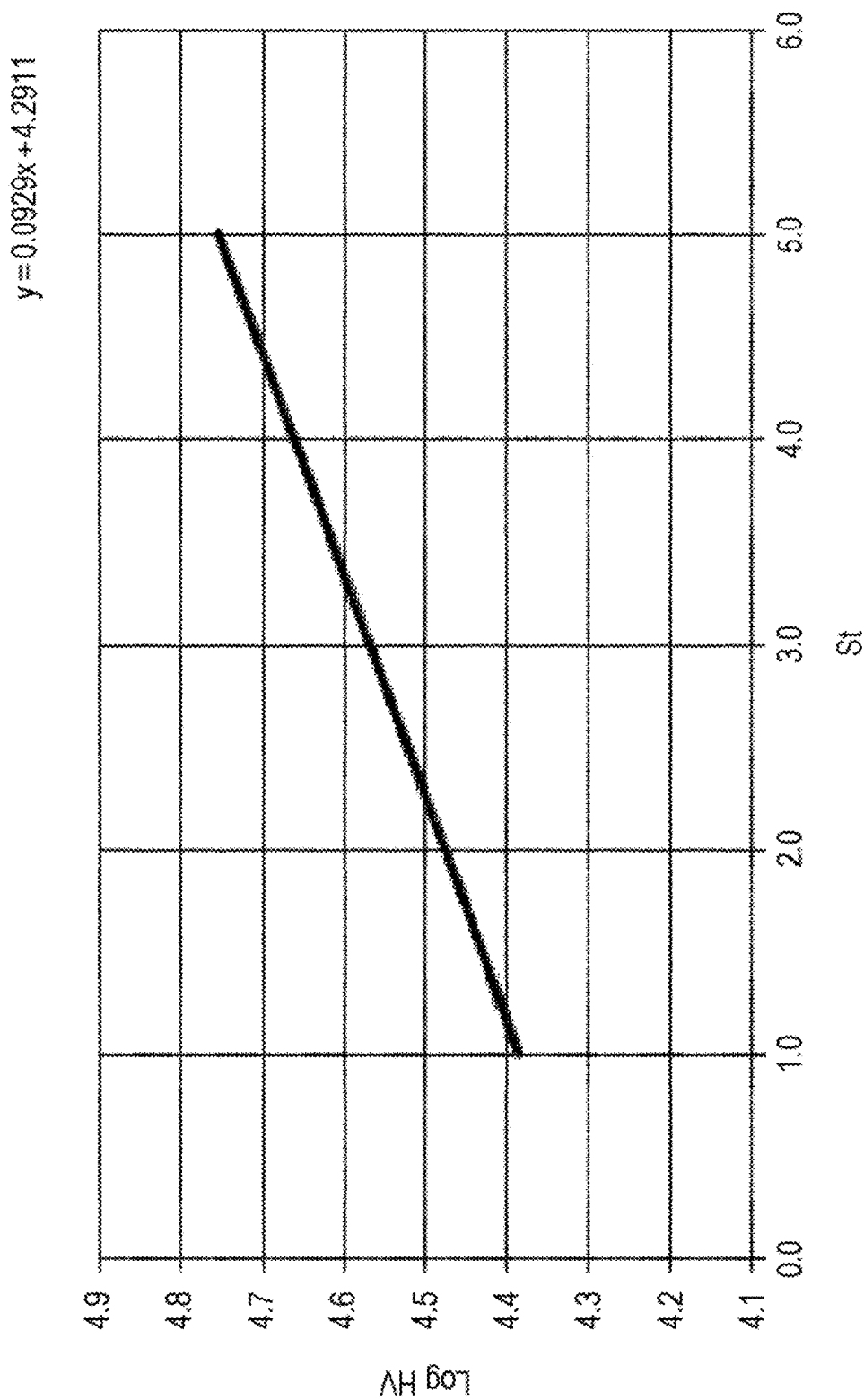
FIG. 6 is a graph substituted for a diagram that illustrates one example of a linear relationship in a case where it is assumed that a vertical axis indicates Log HV and a horizontal axis indicates St.

The optical detection unit 22 optically detects particles that flow in the flow passage P. In the present technology, the optical detection unit 22 includes a plurality of optical detectors. Moreover, the optical detection unit can include a signal processing unit for converting an electric signal obtained by the plurality of optical detectors into a digital signal. The digital signal obtained by the conversion by the signal processing unit can be transmitted to the information processing unit. The signal data can be proceeded as optical data in the information processing unit. The optical data can include fluorescence data. More specifically, the optical data can be light intensity data including fluorescence intensity data (ex. Height, Area, Width). Applied voltage coefficients (hereinafter also referred to as "St values") that are different from each other can be set for the plurality of optical detectors. Here, the applied voltage coefficient (the St value) is a value that is calculated from a voltage applied to an optical detector and a feature amount of an optical data from the optical detector. For example, plotting is performed using Log High Voltage (HV) and Log Height Median as axes, as illustrated in FIGS. 5 and 6, on the basis of a correspondence relationship between a feature amount, such as a height median, that is obtained from an optical detector and an HV, and a linear function is obtained. At this time, Log Height Median can be defined as the applied voltage coefficient (the St value). Note that, the optical data (ex. Height, Area, Width) can be used instead of the feature amount.

The plurality of optical detectors can respectively receive rays of light that have been emitted from a particle due to irradiation with rays of excitation light that have wavelengths different from each other. Furthermore, the plurality of optical detectors can receive light that has been emitted from a particle due to irradiation with excitation light having the same wavelength.

In the present technology, a specific optical detection method of an optical detector that can be used in the optical detection unit 22 is not particularly limited if the optical detector can detect optical signals from particles, and an optical detection method used in a publicly known optical detector can be freely selected and employed. For example, one optical detection method or a free combination of two or more optical detection methods can be employed from among optical detection methods that are used in a fluorescence detecting instrument, a scattered light detecting instrument, a transmitted light detecting instrument, a reflected light detecting instrument, a diffracted light detecting instrument, an ultraviolet spectrometer, an infrared spectrometer, a Raman spectrometer, a FRET detecting instrument, a FISH detecting instrument, various other spectrum detecting instruments, a PMT array or a photodiode array obtained by one-dimensionally arranging light-receiving elements such as PMTs or photodiodes, plural arranged independent detection channels such as two-dimensional light-receiving elements, e.g., CCDs, CMOS, or the like, and the like.

Furthermore, a position where the optical detection unit 22 is provided in the particle detection apparatus 2 according to the present technology is not particularly limited if optical signals from particles can be detected, and can be freely designed. For example, as illustrated in FIGS. 1 to 4, it is preferable that the optical detection unit 22 be disposed on a side different from a side of the light irradiation unit 21 with the flow passage P interposed between the optical detection unit 22 and the light irradiation unit 21. This is because the light irradiation unit 21 and the optical detection unit 22 can be disposed in a configuration having a higher degree of freedom by disposing the optical detection unit 22 on a side different from a side of the light irradiation unit 21 with the flow passage P interposed between the optical detection unit 22 and the light irradiation unit 21. Furthermore, for example, fluorescence is also emitted in a direction that is different from an incident direction of irradiation light, and therefore the optical detection unit 22 may be disposed on the same side as a side of the light irradiation unit 21 with respect to the flow passage P or on a side on which the optical detection unit 22 and the light irradiation unit 21 form an angle of 90 degrees.

(4) Information Processing Apparatus 1 (Information Processing Unit 11)

In the present technology, the information processing apparatus 1 (the information processing unit 11) performs information processing on an optical data from fluorescence that has been detected from a particle by the optical detection unit 22. Details of an information processing method are described below.

(4-1) Correction Unit 111

The correction unit 111 performs correction to cause optical data from fluorescence that have been detected from a particle by a plurality of optical detectors that has been set to be different in the applied voltage coefficient to match an output level that is detected at the same applied voltage coefficient.

Figure 7A:
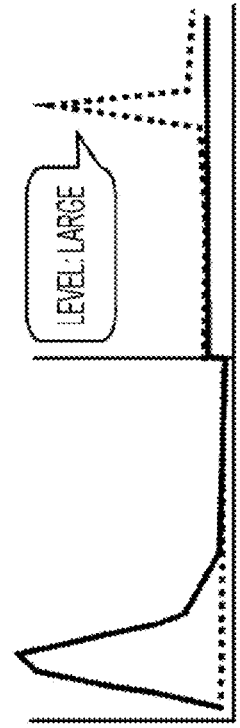
FIG. 7A is a graph substituted for a diagram that illustrates an optical data level obtained from a particle in a case where the applied voltage coefficients (St values) of all of the detectors are collectively set.
Figure 7B:
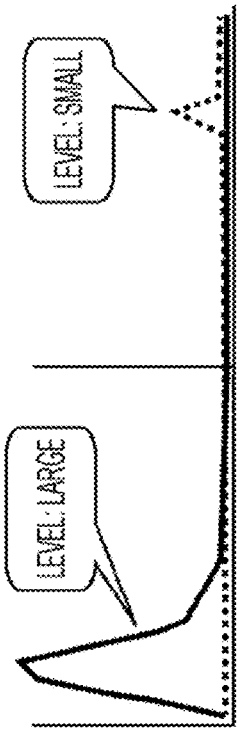
FIG. 7B is a graph substituted for a diagram that illustrates an optical data level obtained from a particle in a case where an applied voltage coefficient (an St value) is set for each wavelength of excitation light.

For example, in a case where applied voltage coefficients (St values) of all of the detectors are collectively set, as in related art, a voltage to be applied is controlled to avoid saturation in a state where priority is given to a bright dye. In this case, as illustrated in FIG. 7A, a level in the case of a dark dye (in FIG. 7A, wavelength 2) is low, and therefore an S/N value decreases in some cases. In contrast, as illustrated in FIG. 7B, by employing the present technology and increasing an applied voltage coefficient (an St value) to be set in an optical detector that detects light that has been emitted from a particle due to irradiation with excitation light having wavelength 2, a level in the case of wavelength 2 can be increased. As described above, by increasing an applied voltage coefficient (an St value) in an area having a low dye level and performing detection, a state of a satisfactory S/N ratio can be generated in all of the areas.

Note that, in FIG. 7B, an applied voltage coefficient (an St value) is set for each wavelength of excitation light. However, in a case where light that has been emitted from a particle due to irradiation with excitation light having the same wavelength is received by a plurality of optical detectors, the applied voltage coefficient (the St value) can be set for each of the optical detectors, as described later.

Next, recalculation is performed to cause optical data detected as described above to match an output level that is detected at the same applied voltage coefficient (St value). In this case, it is preferable that correction be performed to match an output level that is detected at a minimum applied voltage coefficient. In a case where a level is re-calculated from each state, a correlation between an applied voltage coefficient (an St value) and an output level has been calculated due to normalization, and therefore the correlation can be used.

Such a correction method according to the present technology can be used to detect a fluorescence reference particle that emits fluorescence having a predetermined wavelength bandwidth, and can also be used to detect a particle to be analyzed.

As described above, by employing the present technology, even in a case where an applied voltage coefficient (an St value) has been changed before the detection of a fluorescence reference particle that emits fluorescence having a predetermined wavelength bandwidth or a particle to be analyzed, it is not necessary to perform detection again, and fluorescence separation processing (unmixing) described later can be performed. Furthermore, with respect to compensation described later, similarly, it is not necessary to perform correction again. Moreover, in a case where the intensity of light in a continuous wavelength range is detected as a fluorescence spectrum, there is an advantage in which it is not necessary to manually control a voltage to be applied.

A more specific method is described below with reference to an example where flow cytometry is performed using two rays of excitation light different from each other.

(a) Case Where a Plurality of Optical Detectors is Set to be Different in Applied Voltage Coefficients for Each Excitation Light (a-1) Detection of Fluorescence Reference Particle (Single Stain)

Figure 8A:
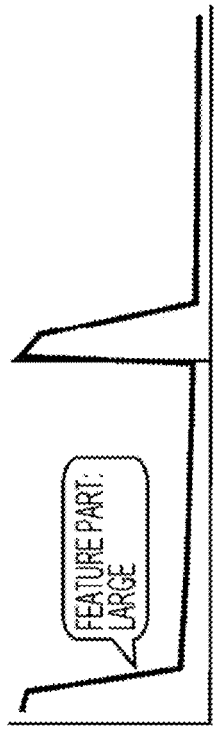
FIG. 8A is a graph substituted for a diagram that illustrates a feature part obtained from a fluorescence reference particle (a single stain) in a case where the same applied voltage coefficient (for example, St value: 3) is set for wavelength 1 and wavelength 2.
Figure 8B:
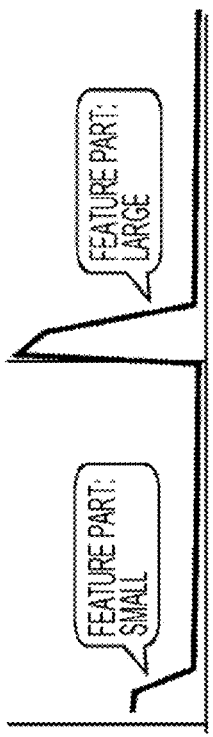
FIG. 8B is a graph substituted for a diagram that illustrates a feature part obtained from a fluorescence reference particle (a single stain) in a case where an applied voltage coefficient (an St value) is set for each wavelength of excitation light.

For example, as illustrated in FIG. 8A, in a case where the same applied voltage coefficient (for example, St value: 3) has been set for wavelength 1 and wavelength 2 and in a case where the level of a feature part in the case of wavelength 1 is low, if the applied voltage coefficient (the St value) for wavelength 1 is increased (for example, St value: 5), the level of the feature part in the case of wavelength 1 is increased, as illustrated in FIG. 8B, an S/N ratio is improved, and the feature part can be caused to become apparent. This improves the separation performance of a fluorescence reference particle (a single stain).

Next, correction is performed to match a level that corresponds to the same applied voltage coefficient (the same St value), for example, a lowest St value, and a relative spectral shape of the fluorescence reference particle (the single stain) is calculated. In the example of FIGS. 8A and 8B, data of wavelength 1 is calculated to correspond to an St value of 3, and the continuous spectral shape of the fluorescence reference particle (the single stain) is calculated.

(a-2) Detection of Particle to be Analyzed (Actual Sample)

Figure 9A:
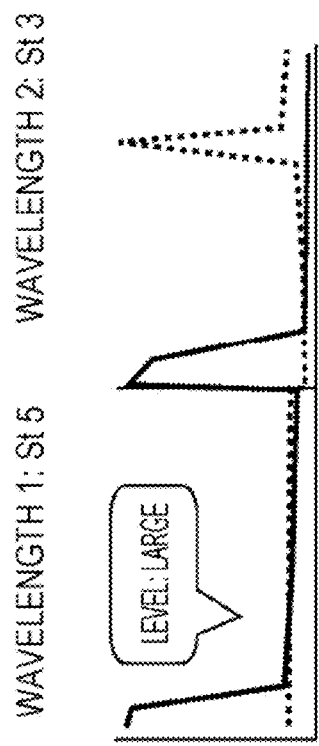
FIG. 9A is a graph substituted for a diagram that illustrates an optical data level obtained from an actual sample in a case where the same applied voltage coefficient (for example, St value: 3) is set for wavelength 1 and wavelength 2.
Figure 9B:
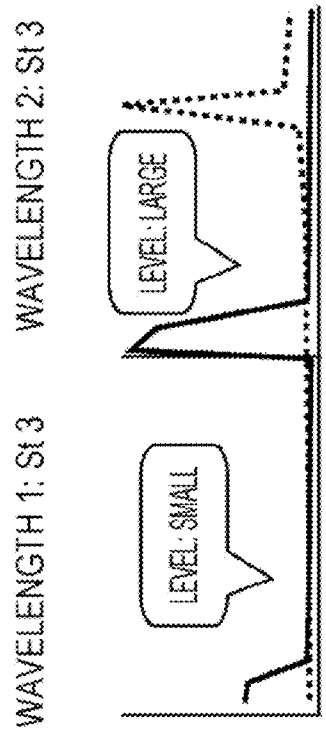
FIG. 9B is a graph substituted for a diagram that illustrates an optical data level obtained from an actual sample in a case where an applied voltage coefficient (an St value) is set for each wavelength of excitation light.

For example, as illustrated in FIG. 9A, in a case where the same applied voltage coefficient (for example, St value: 3) has been set for wavelength 1 and wavelength 2 and in a case where a level in the case of wavelength 1 is low, the applied voltage coefficient (the St value) for wavelength 1 is increased (for example, St value: 5), and an actual sample is detected in this state (see FIG. 9B).

Next, correction is performed to match a level that corresponds to the same applied voltage coefficient (the same St value), for example, a lowest St value, and the spectrum of the actual sample is calculated. In the example of FIGS. 9A and 9B, data of wavelength 1 is calculated to correspond to an St value of 3, and the spectrum of the actual sample is calculated.

(a-3) Fluorescence Separation Processing (Unmixing)

Fluorescence separation processing (unmixing) is performed on the spectrum obtained in (a-2) described above of the actual sample, by using the spectral shape obtained in (a-1) described above of the fluorescence reference particle (the single stain).

After fluorescence separation processing (unmixing), a level in the case of wavelength 1 can be recalculated to correspond to an St value of 5, and a result can be displayed.

(b) Case Where Applied Voltage Coefficient (St value) is Set for Each Optical Detector In (a) described above, the applied voltage coefficient (the St value) is set for each wavelength of excitation light. However, in a case where light that has been emitted from a particle due to irradiation with excitation light having the same wavelength is received by a plurality of optical detectors, the applied voltage coefficient (the St value) can be set for each of the plurality of optical detectors. The description below is provided by using, as an example, a case where the applied voltage coefficient (the St value) is changed for each PMT.

(b-1) Detection of Fluorescence Reference Particle (Single Stain)

Figure 10A:
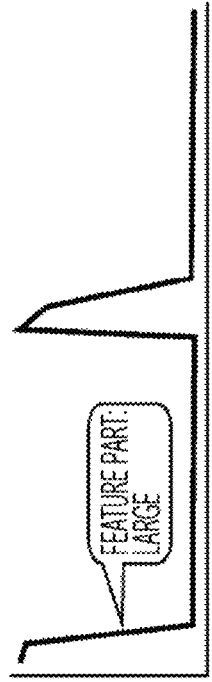
FIG. 10A is a graph substituted for a diagram that illustrates a feature part obtained from a fluorescence reference particle (a single stain) in a case where the same applied voltage coefficient (for example, St value: 3) is set for all of the PMTs in the cases of respective wavelengths.
Figure 10B:
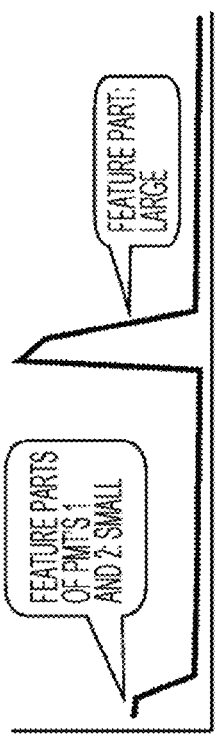
FIG. 10B is a graph substituted for a diagram that illustrates a feature part obtained from a fluorescence reference particle (a single stain) in a case where the applied voltage coefficients (St values) of PMTs 1 and 2 in the case of wavelength 1 have been increased.

For example, as illustrated in FIG. 10A, in a case where the same applied voltage coefficient (for example, St value: 3) has been set for all of the PMTs in the cases of respective wavelengths and in a case where the levels of feature parts of PMTs 1 and 2 in the case of wavelength 1 are low, if the applied voltage coefficients (the St values) of PMTs 1 and 2 in the case of wavelength 1 are increased (for example, St value: 5), the levels of the feature parts in the case of wavelength 1 are increased, as illustrated in FIG. 10B, S/N ratios are improved, and the feature parts can be caused to become apparent. This improves the separation performance of a fluorescence reference particle (a single stain).

Next, correction is performed to match a level that corresponds to the same applied voltage coefficient (the same St value), for example, a lowest St value, and a relative spectral shape of the fluorescence reference particle (the single stain) is calculated. In the example of FIGS. 10A and 10B, data of PMTs 1 and 2 in the case of wavelength 1 is calculated to correspond to an St value of 3, and the continuous spectral shape of the fluorescence reference particle (the single stain) is calculated.

(b-2) Detection of Particle to be Analyzed (Actual Sample)

Similarly to a relationship between (a-1) described above and (a-2) described above, the applied voltage coefficients (the St values) of PMTs 1 and 2 in the case of wavelength 1 are increased (for example, St value: 5), and an actual sample is detected in this state.

Next, correction is performed to match a level that corresponds to the same applied voltage coefficient (the same St value), for example, a lowest St value, and the spectrum of the actual sample is calculated. In the example of FIGS. 10A and 10B, data of PMTs 1 and 2 in the case of wavelength 1 is calculated to correspond to an St value of 3, and the spectrum of the actual sample is calculated.

(b-3) Fluorescence Separation Processing (Unmixing)

Fluorescence separation processing (unmixing) is performed on the spectrum obtained in (b-2) described above of the actual sample, by using the spectral shape obtained in (b-1) described above of the fluorescence reference particle (the single stain).

After fluorescence separation processing (unmixing), a level in the case of wavelength 1 can be recalculated to correspond to an St value of 5, and a result can be displayed.

Figure 11:
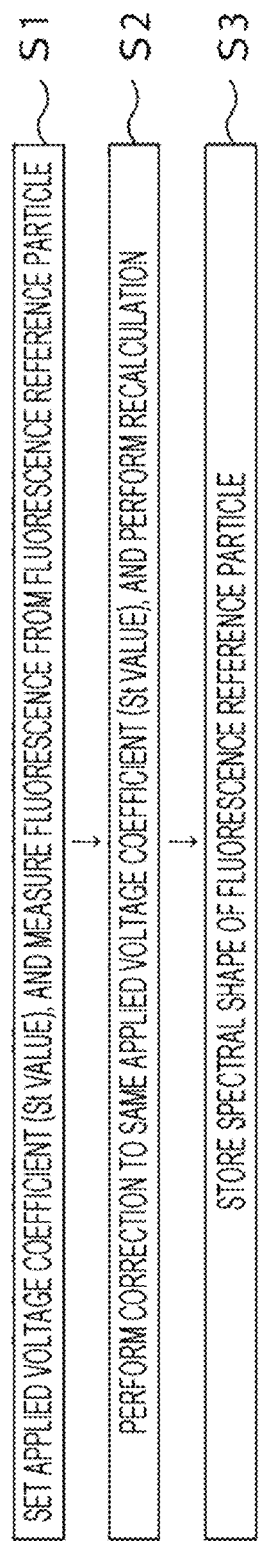
FIG. 11 is a flowchart illustrating one example of a flow of processing performed on fluorescence reference particle (single stain) data.
Figure 12:
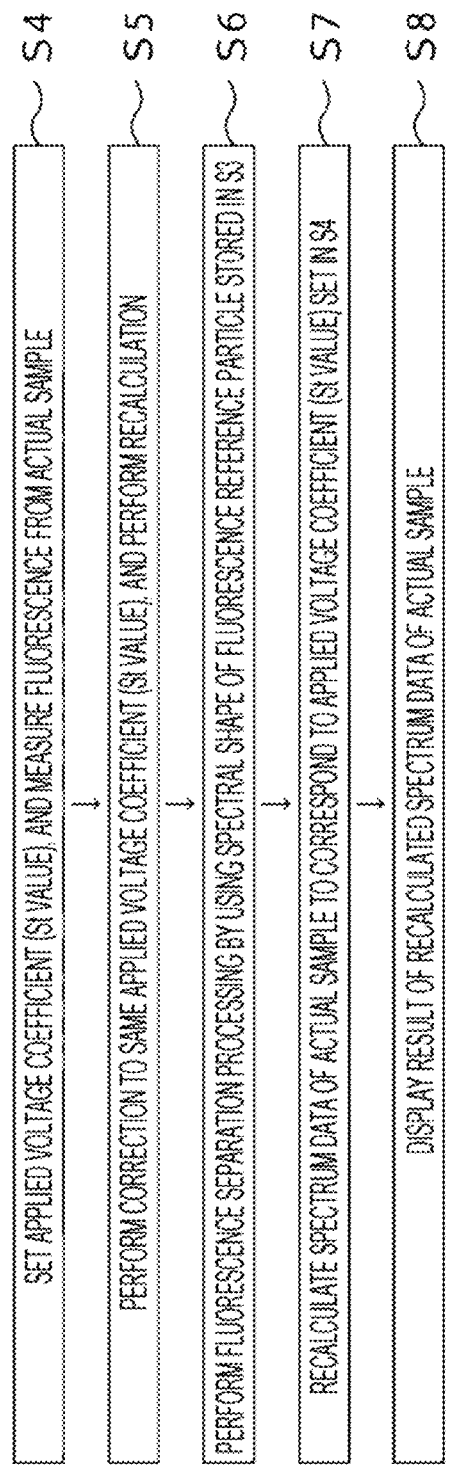
FIG. 12 is a flowchart illustrating one example of a flow of processing performed on actual sample data.
Figure 13:
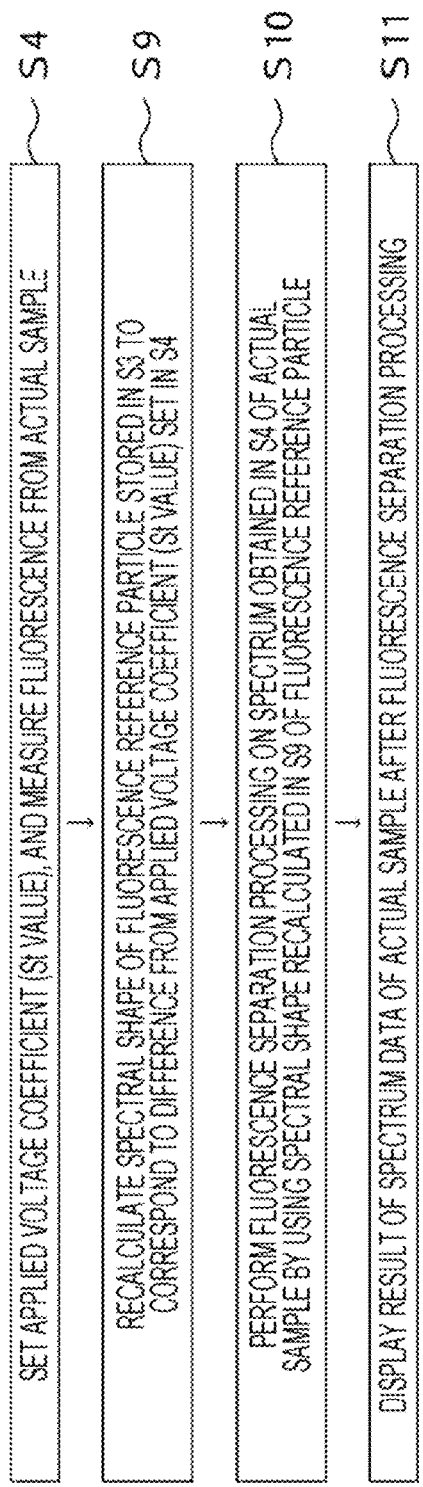
FIG. 13 is a flowchart illustrating a variation of the flow of processing performed on the actual sample data.

The description above is summarized, and a flow of processing performed on fluorescence reference particle (single stain) data and a flow of processing performed on actual sample data are illustrated in FIGS. 11 and 12. Note that, in processing performed on actual sample data, a variation that is different from the example described above of the flow of processing performed on the actual sample data (see FIG. 13) can also be used.

(Flow of Processing Performed on Fluorescence Reference Particle (Single Stain) Data (see FIG. 11))

First, an applied voltage coefficient (an St value) is set for each wavelength of excitation light or for each optical detector, and fluorescence from a fluorescence reference particle (a single stain) is detected (S1).

Next, the obtained data is corrected to match a level that corresponds to the same applied voltage coefficient (the same St value), for example, a lowest St value, and recalculation is performed (S2).

The continuous spectral shape of the fluorescence reference particle (the single stain) that has been obtained in recalculation is stored as the spectral shape of the fluorescence reference particle (the single stain) (S3).

(Flow of Processing Performed on Actual Sample Data (see FIG. 12))

First, an applied voltage coefficient (an St value) is set for each wavelength of excitation light or for each optical detector, and fluorescence from an actual sample is detected (S4).

Next, the obtained data is corrected to match a level that corresponds to the same applied voltage coefficient (the same St value), for example, a lowest St value, and recalculation is performed (S5).

Fluorescence separation processing (unmixing) is performed on the spectrum obtained in recalculation of the actual sample, by using the spectral shape stored in S3 described above of the fluorescence reference particle (the single stain) (S6).

Recalculation is performed again on spectrum data of the actual sample after fluorescence separation processing (unmixing) to correspond to the applied voltage coefficient (the St value) that has been set in S4 described above (S7).

A result of recalculated spectrum data of the actual sample is displayed (S8).

(Variation of Flow of Processing Performed on Actual Sample Data (see FIG. 13))

First, an applied voltage coefficient (an St value) is set for each wavelength of excitation light or for each optical detector, and fluorescence from an actual sample is detected (S4).

Next, recalculation is performed on the spectral shape stored in S3 described above of the fluorescence reference particle (the single stain) to correspond to the applied voltage coefficient (the St value) that has been set in S4 described above (S9). At this time, in a case where the setting of the applied voltage coefficient (the St value) that has been set in S4 changes for each wavelength of excitation light or for each optical detector, data stored in S3 described above of the fluorescence reference particle (the single stain) is corrected by using a difference from a lowest applied voltage coefficient (a lowest St value), and therefore a spectral shape is recalculated. By using this method, even in a case where the applied voltage coefficient (the St value) of the fluorescence reference particle (the single stain) has not been stored, the fluorescence reference particle (the single stain) can be corrected to correspond to actual sample data. In a case where the applied voltage coefficient (the St value) of the fluorescence reference particle (the single stain) has been stored in a storage, recalculation is performed on the spectral shape stored in S3 described above of the fluorescence reference particle (the single stain) to correspond to the applied voltage coefficient (the St value) that has been set in S4 described above.

Fluorescence separation processing (unmixing) is performed on the spectrum obtained in S4 of the actual sample, by using the spectral shape recalculated in S9 described above of the fluorescence reference particle (the single stain) (S10).

A result of the spectrum data of the actual sample after fluorescence separation processing (unmixing) is displayed (S11).

As described in this variation, fluorescence separation processing is performed, by using optical data that have been obtained from an actual sample by a plurality of optical detectors that has been set to be different in an applied voltage coefficient, and values obtained by performing recalculation on values obtained by correcting optical data obtained from a fluorescence reference particle (a single stain) to match output levels detected at the same applied voltage coefficient to match output levels detected at applied voltage coefficients that have been set to be different in the detection of fluorescence emitted from the actual sample. This enables a result to be displayed without performing a process of performing recalculation again on the spectrum data of the actual sample after fluorescence separation processing (unmixing) to correspond to the applied voltage coefficients (the St values) that have been set in S4 described above (the process of S7).

(4-2) Setting Unit 12 (112)

The information processing apparatus 1, the particle detection apparatus 2, and the particle detection system 3 according to the present technology can include the setting unit 12 (112). The setting unit 12 (112) sets an applied voltage value (an St value) according to an output level of an optical detector in the optical detection unit 22. In the present technology, this setting unit 12 (112) may be omitted, and a user may manually set the applied voltage coefficient (the St value). However, by providing the setting unit 12 (112), the applied voltage coefficient (the St value) can be automatically set according to the output level of the optical detector.

(4-3) Fluorescence Separation Processing Unit 13 (113)

The information processing apparatus 1, the particle detection apparatus 2, and the particle detection system 3 according to the present technology can include the fluorescence separation processing unit 13 (113). The fluorescence separation processing unit 13 (113) performs fluorescence separation processing (unmixing) by using a value obtained by correcting an optical data obtained from a fluorescence reference particle (a single stain) to match an output level detected at the same applied voltage coefficient and a value obtained by correcting an optical data obtained from a particle to be analyzed (an actual sample) to match an output level detected at the same applied voltage coefficient (see [Flow of processing performed on actual sample data (see FIG. 12)] described above).

Furthermore, the fluorescence separation processing unit 13 (113) performs fluorescence separation processing (unmixing) by using optical data that have been obtained from a particle to be analyzed (an actual sample) by a plurality of optical detectors that has been set to be different in an applied voltage coefficient and values obtained by performing recalculation on values obtained by correcting optical data obtained from a fluorescence reference particle (a single stain) to match an output level detected at the same applied voltage coefficient to match output levels detected at applied voltage coefficients that have been set to be different in the detection of fluorescence emitted from the particle to be analyzed (the actual sample) (see [Variation of flow of processing performed on actual sample data (see FIG. 13)]).

Note that, in the present technology, the fluorescence separation processing unit 13 (113) may be omitted, and fluorescence separation processing (unmixing) can be performed by using an external information processing apparatus or the like.

(4-4) Storage 14 (114)

The information processing apparatus 1, the particle detection apparatus 2, and the particle detection system 3 according to the present technology can include the storage 14 (114) that stores various types of data. The storage 14 (114) can store any matter relating to detection, such as optical data relating to a particle that has been detected by the optical detection unit 22, a record of correction processing performed by the correction unit 111, a record of setting conditions in the setting unit 12 (112), or a record of fluorescence separation processing (unmixing) performed by the fluorescence separation processing unit 13 (113).

Furthermore, as described above, in the present technology, the storage 14 (114) can be provided in a cloud environment, and therefore respective users can share, via a network, various types of information that have been recorded in the storage 14 (114) on a cloud.

Specifically, normalized data obtained in the present technology is stored in the storage 14 (114) on the cloud, and is shared by users who possess devices different from each other. This enables the reuse of data, and this can contribute to improvements in usability.

More specifically, for example, waveform data (spectrum reference data) after normalization of a fluorescence reference particle (a single stain) is recorded in the storage 14 (114) on the cloud such that users can share the waveform data. This enables each of the users to select spectrum reference data of fluorescence to be used in an experiment from the storage 14 (114) on the cloud, and perform fluorescence separation processing between the spectrum reference data and experiment data of each of the devices. With this configuration, each of the users does not need to detect the fluorescence reference particle (the single stain) every time.

Furthermore, spectrum reference data before normalization together with an application voltage coefficient (an St value) can be recorded in advance in the storage 14 (114) on the cloud, and, before fluorescence separation processing, processing can be performed for performing correction to an applied voltage coefficient (an St value) that corresponds to experiment data obtained in each of the devices.

Note that, in the present technology, the storage 14 (114) may be omitted, and various types of data can be stored by using an external storage device or the like.

(4-5) Display Unit 15 (115)

The information processing apparatus 1, the particle detection apparatus 2, and the particle detection system 3 according to the present technology can include the display unit 15 (115) that displays various types of information. The display unit 15 (115) can display any matter relating to detection, such as optical data relating to a particle that has been detected by the optical detection unit 22, various types of data that have been corrected by the correction unit 111, or a result of fluorescence separation processing (unmixing) performed by the fluorescence separation processing unit 13 (113).

In the present technology, the display unit 15 (115) may be omitted, and an external display device may be connected. As the display unit 15 (115), for example, a display, a printer, or the like can be used.

(4-6) User Interface 16 (116)

The information processing apparatus 1, the particle detection apparatus 2, and the particle detection system 3 according to the present technology can further include the user interface 16 (116) serving as a portion that is used by a user to perform an operation. A user can access respective units via the user interface 16 (116), and can control the respective units.

In the present technology, the user interface 16 (116) may be omitted, and an external operation device may be connected. As the user interface 16 (116), for example, a mouse, a keyboard, or the like can be used.

(5) Sorting Unit 23

The information processing apparatus 1, the particle detection apparatus 2, and the particle detection system 3 according to the present technology can include the sorting unit 23. The sorting unit 23 sorts particles on the basis of optical data detected by the optical detection unit 22. For example, the sorting unit 23 can sort particles on a downstream side of the flow passage P on the basis of an analysis result of a size, a form, an internal structure, or the like of a particle that has been analyzed from the optical data. A sorting method according to each of the embodiments is described below.

For example, in the embodiments illustrated in FIGS. 2 and 3, vibration is applied to the entirety or part of the principal flow passage P13 by using, for example, a vibration element 23a that vibrates at a predetermined frequency, and this causes a droplet to be generated from a discharge port of the principal flow passage P13. Note that, in this case, a vibration element 23a to be used is not particularly limited, and a publicly known vibration element can be freely selected and can be used. Examples include a piezo vibration element and the like. Furthermore, by adjusting amounts of liquid fed to the sample liquid flow passage P11, the sheath liquid flow passages P12a and P12b, and the principal flow passage P13, the diameter of the discharge port, the frequency of the vibration element, or the like, the size of a droplet can be adjusted, and droplets that each include a fixed number of particles can be generated.

Next, positive or negative charges are applied on the basis of the size, the form, the internal structure, or the like of the particle that has been analyzed on the basis of the optical data detected by the optical detection unit 22 (see reference sign 23b in FIGS. 2 and 3). Then, the route of charged droplets is changed in a desired direction by a counter electrode 23c to which a voltage has been applied, and the charged droplets are sorted.

Furthermore, for example, in the embodiment illustrated in FIG. 4, three branched flow passages of a sorting flow passage P14 and disposal flow passages P15a and P15b, are provided on a downstream side of the principal flow passage P13 formed on the substrate T. Particles that have been determined to satisfy a predetermined optical characteristic and serve as sorting targets are taken into the sorting flow passage P14, and particles that have been determined not to satisfy the predetermined optical characteristic and do not serve as sorting targets are caused to flow into any one of the two disposal flow passages P15a and P15b without being taken into the sorting flow passage P14. This enables sorting.

Particles serving as sorting targets can be taken into the sorting flow passage P14 by using a publicly known method. For example, the particles serving as sorting targets can be taken into the sorting flow passage P14, by causing the vibration element 23a such as a piezo element to generate negative pressure in the sorting flow passage P14 and sucking sample liquid including the particles serving as sorting targets or sheath liquid into the sorting flow passage P14 by using this negative pressure. Furthermore, the particles serving as sorting targets can be taken into the sorting flow passage P14 by performing control or a change in a laminar flow direction by using valve electromagnetic force, a fluid stream (gas or liquid), or the like, although this is not illustrated.

In the embodiment illustrated in FIG. 4, a sample liquid storage part B1, a sheath liquid storage part B2, a sorted liquid storage part B3, and waste liquid storage parts B4a and B4b are communicably connected to the sample liquid flow passage P11, the sheath liquid flow passages P12a and P12b, the sorting flow passage P14, and the disposal flow passages P15a and P15b, respectively, and therefore a completely closed type sorting device can be formed. For example, in a case where particles serving as sorting targets are, for example, cells to be used for a cell preparation or the like, in order to maintain a sterile environment and prevent contamination, it is preferable that a completely closed type device (isolated from an external environment), as illustrated in the embodiment of FIG. 4, be designed.

The information processing apparatus 1, the particle detection apparatus 2, and the particle detection system 3 according to the present technology that have been described above can be applied to automatic level adjustment, compensation, setting of a gate, or the like that is described below.

(Automatic Level Adjustment)

An optical data of obtained data undergoes a change due to the high voltage (HV) of an optical detector. In related art, an optical data level has been manually set to match a target value in accordance with a user's feeling, and a sample for this purpose has been prepared. In contrast, in a normalized state, an applied voltage coefficient (an St value) that causes saturation can be calculated on the basis of an applied voltage coefficient (an St value) that has been set and an obtained optical data level. This allows an applied voltage coefficient (an St value) to be adjusted to a target level by using data that has been detected once, and setting can be performed to obtain a desired optical data level. A flow of automatic level adjustment is illustrated in FIG. 14.

Figure 14:
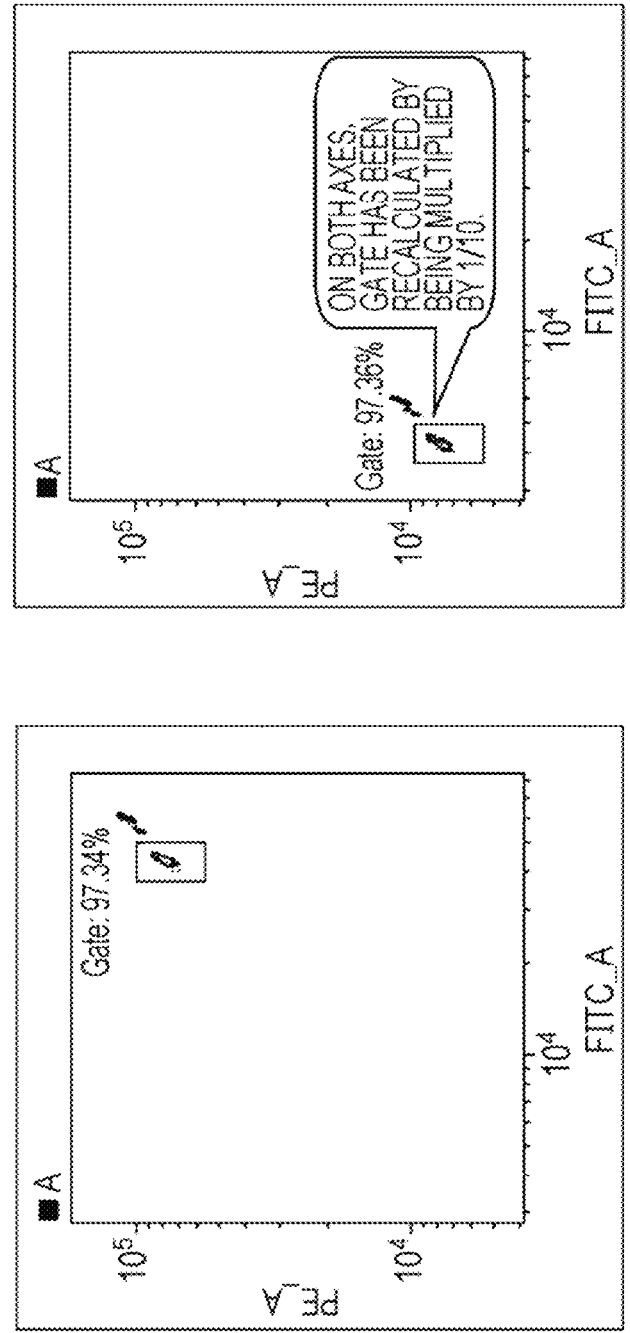
FIG. 14 is a graph substituted for a diagram that illustrates one example of the setting of a gate.

As illustrated in FIG. 14, first, an applied voltage coefficient (an St value) is set for each wavelength of excitation light, and then fluorescence from particles is detected.

Next, in specified data, a maximum value at each of the wavelengths is obtained. In this case, the specified data refers to data of a plurality of samples in a gate.

Then, an applied voltage coefficient (an St value) is reset in such a way that a maximum value at each of the wavelengths matches a target value (for example, half of a saturation level).

Note that FIG. 14 illustrates a case where an applied voltage coefficient (an St value) is set for each wavelength of excitation light, but in a case where the applied voltage coefficient (the St value) is set for each optical detector, the applied voltage coefficient (the St value) can be set for each of the optical detectors to obtain a target value.

(Application to Compensation)

Compensation is set on the basis of a ratio of a spillover amount of a dye, after a high voltage (HV) of an optical detector is set. Therefore, if the high voltage (HV) of an optical detector is changed, it is requested that compensation be set again. However, by changing a normalized applied voltage coefficient (St value), an amount of a change in an optical data level can also be calculated, and therefore recompensation can be automatically performed.

For example, in a case where an applied voltage coefficient (an St value) of an optical detector is changed after compensation has been performed once, compensation can be recalculated again on the basis of the applied voltage coefficient (the St value).

As a specific example, for example, a coefficient of compensation is determined in such a way that an applied voltage coefficient (an St value) of PMT 1 is 3 and an applied voltage coefficient (an St value) of PMT 2 is 3, as described in Table 1 described below.

TABLE 1

|  | PMT1_FITC_St3 | PMT2_PE_St3 |
|---|---|---|
| FITC | 100% | 7% |
| PE | 30% | 100% |

Thereafter, it is assumed that the applied voltage coefficient (the St value) of PMT 2 has been changed to 4, for example, in order to improve an S/N ratio.

In related art, compensation has been set again. However, an amount of a change in an optical data level that is caused by a change in an applied voltage coefficient (an St value) is known (in a case where setting has been performed in such a way that an optical data level at an St value of 4 is ten times an optical data level at an St value of 3), and therefore a coefficient of compensation can be obtained by performing calculation such that FITC-PMT2_PE_St4=7*10=70 (see Table 2).

Furthermore, in PE-PMT1 FITC, in practice, the level of PE-PMT2_PE_St4 is ten times greater, but the level of PE-PMT1_FITC_St3 relatively decreases. Therefore, a coefficient of compensation can be obtained by performing calculation such that PE_PMT1=30/10=3 (see Table 2).

TABLE 2

|  | PMT1_FITC_St3 | PMT2_PE_St4 |
|---|---|---|
| FITC | 100% | 70% |
| PE | 3% | 100% |

(Case of Setting of Gate)

If an applied voltage coefficient (an St value) is changed for each wavelength of excitation light, an optical data level is changed. Therefore, a gate that has been set in an original experiment is calculated again. Accordingly, a gate is defined again due to a change in level. For example, in the example of FIG. 14, in PMT1_FITC_St3/PMT2_PE_St3, levels on both axes are 1/10 the levels in PMT1_FITC_St4/PMT2_PE_St4. This allows a gate to be reset by being multiplied by 1/10, as described above.

As described above, by employing the present technology, in the case of a method for individually setting a voltage to be applied to each optical detector and detecting the intensity of light in each wavelength range, even in a case where the setting of the voltage to be applied is changed, an output level can be prevented from deviating from a gate.

<2. Information Processing Method and Particle Detection Method>

An information processing method according to the present technology is a method for processing a detected optical data in detecting fluorescence emitted from a particle in sample liquid that flows in a flow passage P, and at least a correction process is performed. Furthermore, a setting process, a fluorescence separation processing process, a storing process, a display process, or the like can be performed, as necessary. In a particle detection method according to the present technology, at least an optical detection process and an information processing process are performed, and in the information processing process, at least a correction process is performed. Furthermore, a light irradiation process, a setting process, a fluorescence separation processing process, a storing process, a display process, a sorting process, or the like can be performed, as necessary. Note that respective processes are the same as processes performed by respective units of the information processing apparatus 1, the particle detection apparatus 2, and the particle detection system 3 according to the present technology that have been described above, and therefore the description of details of the respective processes is omitted here.

<3. Computer Program>

A computer program according to the present technology is a program that is used in processing performed on a detected optical data in the detection of fluorescence emitted from a particle in sample liquid that flows in a flow passage P, and is a program that causes a computer to have a correction function of correcting optical data from the fluorescence that have been detected from the particle by a plurality of optical detectors that has been set to be different in an applied voltage coefficient to match an output level detected at the same applied voltage coefficient.

The computer program according to the present technology is recorded in an appropriate recording medium. Furthermore, the computer program according to the present technology can be stored in a cloud environment or the like, and a user can download the computer program in a personal computer or the like via a network, and can use the computer program. Note that the correction function in the computer program according to the present technology is the same as a correction function of the correction unit 111 of the information processing apparatus 1, the particle detection apparatus 2, and the particle detection system 3 that have been described above, and therefore description is omitted here.

Note that the present technology can also employ the configuration described below.

(1) An information processing apparatus including:
a correction unit that performs correction on optical data from fluorescence that have been detected from a particle by a plurality of optical detectors to match an output level detected at an identical applied voltage coefficient, the plurality of optical detectors having been set to be different in an applied voltage coefficient.

(2)
The information processing apparatus described in (1), in which the applied voltage coefficient is calculated from a voltage applied to each of the plurality of optical detectors and a feature amount of an optical data from each of the plurality of optical detectors.

(3)
The information processing apparatus described in any of (1) to (2),
in which the correction unit performs the correction on the optical data to match an output level detected at a minimum applied voltage coefficient.

(4)
The information processing apparatus described in any of (1) to (3), further including:

a setting unit that sets the applied voltage coefficient in accordance with an output level of each of the plurality of optical detectors.

(5)

The information processing apparatus described in any of (1) to (4),
in which the particle includes a fluorescence reference particle that emits fluorescence having a predetermined wavelength bandwidth.

(6)

The information processing apparatus described in (5),
in which the particle is a particle to be analyzed.

(7)

The information processing apparatus described in (6), further including:
a fluorescence separation processing unit that performs fluorescence separation processing by using
values obtained by performing the correction on optical data obtained from the fluorescence reference particle, and
values obtained by performing the correction on optical data obtained from the particle to be analyzed.

(8)

The information processing apparatus described in (5), further including:
a fluorescence separation processing unit that performs fluorescence separation processing by using
optical data that have been obtained from the particle to be analyzed by the plurality of optical detectors that has been set to be different in the applied voltage coefficient, and values obtained by recalculating values obtained by performing the correction on optical data obtained from the fluorescence reference particle to match output levels detected at the applied voltage coefficients that has been set to be different in detection of fluorescence emitted from the particle to be analyzed.

(9)

A particle detection apparatus including:
a optical detection unit that includes a plurality of optical detectors that detects fluorescence emitted from a particle; and
an information processing unit that processes optical data obtained from the optical detection unit,
in which the information processing unit includes
a correction unit that performs correction on optical data detected by the plurality of optical detectors to match an output level detected at an identical applied voltage coefficient, the plurality of optical detectors having been set to be different in an applied voltage coefficient.

(10)

The particle detection apparatus described in (9),
in which the plurality of optical detectors respectively receive rays of light that have been emitted from the particle due to irradiation with rays of excitation light having wavelengths different from each other.

(11)

The particle detection apparatus described in (9) or (10),
in which the correction unit performs the correction on the optical data detected by the plurality of optical detectors that has been set to be different in the applied voltage coefficient for each of rays of excitation light having wavelengths different from each other to match the output level detected at the identical applied voltage coefficient.

(12)

The particle detection apparatus described in any of (9) to (11), in which the plurality of optical detectors receives light that has been emitted from the particle due to irradiation with excitation light having an identical wavelength.

(13)

The particle detection apparatus described in (12),
in which the applied voltage coefficient is set for each of the plurality of optical detectors.

(14)

An information processing method including:
performing correction on optical data from fluorescence that have been detected from a particle by a plurality of optical detectors to match an output level detected at an identical applied voltage coefficient, the plurality of optical detectors having been set to be different in an applied voltage coefficient.

(15)

A particle detection method including:
detecting fluorescence emitted from a particle by using a plurality of optical detectors; and
processing optical data obtained in the detecting,
in which the processing includes
performing correction on optical data detected by the plurality of optical detectors to match an output level detected at an identical applied voltage coefficient, the plurality of optical detectors having been set to be different in an applied voltage coefficient.

(16)

A computer program that causes a computer to perform correction on optical data from fluorescence that have been detected from a particle by a plurality of optical detectors to match an output level detected at an identical applied voltage coefficient, the plurality of optical detectors having been set to be different in an applied voltage coefficient.

(17)

A particle detection apparatus comprising:
a plurality of optical detectors configured to detect light from a particle, wherein at least one of optical detectors has an applied voltage coefficient different from other optical detectors; and
a processor including a processing device and a memory storing instructions that, when executed by the processing device, cause the processor to:
correct optical data obtained from the particle in accordance with differentiation between applied voltage coefficients of the plurality of optical detectors and a predetermined applied voltage coefficient.

(18)

The particle detection apparatus described in (17), wherein the applied voltage coefficient is determined from relationship between a voltage applied to each of the plurality of optical detectors and a feature amount of optical data obtained from each of the plurality of optical detectors.

(19)

The particle detection apparatus described in (17) or (18), wherein the predetermined applied voltage coefficient is a minimum applied voltage coefficient in the applied voltage coefficients of the plurality of optical detectors.

(20)

The particle detection apparatus described in any of (17) to (19), further including a storage configured to store corrected data obtained by correcting the optical data.

(21)
The particle detection apparatus described in any of (17) to (20), the processor resets the applied voltage coefficient in accordance with the optical data of each of the plurality of optical detectors.

(22)
The particle detection apparatus described in any of (17) to (21), further including a storage configured to store the optical data with the applied voltage coefficients for each of the plurality of optical detectors.

(23)
The particle detection apparatus described in any of (17) to (22), wherein the particle is a particle to be analyzed, and the processor performs fluorescence separation processing by using optical data obtained from a single stain particle and corrected data by correcting the optical data of the particle to be analyzed to adjust.

(24)
The particle detection apparatus according described in (23), wherein the fluorescence separation processing is performed by using corrected data by correcting the optical data of the single stain particle.

(25)
The particle detection apparatus described in any of (17) to (24), wherein each of the plurality of optical detectors detects light that have been emitted from the particle by irradiating excitation light with wavelengths different from each other.

(26)
The particle detection apparatus described in any of (17) to (24), wherein two or more of the plurality of optical detectors detects light that have been emitted from the particle by irradiating excitation light with same wavelengths.

(27)
An information processing apparatus comprising:
a processor including a processing device and a memory storing instructions that, when executed by the processing device, cause the processor to:
correct optical data of light detected from a particle by a plurality of optical detectors in accordance with differentiation between applied voltage coefficients of the plurality of optical detectors and a predetermined applied voltage coefficient,
wherein at least one of optical detectors has an applied voltage coefficient different from other optical detectors.

(28)
The information processing apparatus described in (27), wherein the particle is a single stain particle, and the processer performs fluorescence separation processing by using optical data obtained from a particle to be analyzed and corrected data by correcting the optical data of the single stain particle.

(29)
The information processing apparatus described in (28), wherein the optical data of the single stain particle is corrected so as to adjust to output levels of the particle to be analyzed detected at the predetermined applied voltage coefficients.

(30)
The information processing apparatus described in (28) or (29), the fluorescence separation processing is performed by using corrected data by correcting the optical data of the particle to be analyzed.

(31)
An information processing method comprising:
correcting optical data of light detected from a particle by a plurality of optical detectors in accordance with differentiation between applied voltage coefficients of the plurality of optical detectors and a predetermined applied voltage coefficient,
wherein at least one of optical detectors has an applied voltage coefficient different from other optical detectors.

(32)
A particle detection method comprising:
detecting light from a particle, wherein at least one of optical detectors has an applied voltage coefficient different from other optical detectors;
correcting optical data obtained from the particle in accordance with differentiation between applied voltage coefficients of the plurality of optical detectors and a predetermined applied voltage coefficient.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Information processing apparatus
2 Particle detection apparatus
3 Particle detection system
P Flow passage
21 Light irradiation unit
22 Optical detection unit
11 Information processing unit
111 Correction unit
12, 112 Setting unit
13, 113 Fluorescence separation processing unit
14, 114 Storage
15, 115 Display unit
16, 116 User interface
23 Sorting unit

The invention claimed is:

1. A particle detection apparatus comprising:
a plurality of optical detectors configured to detect light from a particle, each of the plurality of optical detectors having a respective applied voltage coefficient, wherein at least one of the plurality of optical detectors has the applied voltage coefficient higher than a predetermined applied voltage coefficient of the plurality of optical detectors; and
a processor including a processing device and a memory storing instructions that, when executed by the processing device, cause the processor to:
correct optical data obtained by the plurality of optical detectors from the particle in accordance with a difference between the respective applied voltage coefficient for each of the plurality of optical detectors and the predetermined applied voltage coefficient.

2. The particle detection apparatus according to claim 1, wherein the applied voltage coefficient for each of the plurality of optical detectors is determined from a feature amount of optical data obtained from each of the plurality of optical detectors based on the predetermined applied voltage coefficients.

3. The particle detection apparatus according to claim 1, wherein the predetermined applied voltage coefficient is a minimum applied voltage coefficient among the respective applied voltage coefficients of the plurality of optical detectors.

4. The particle detection apparatus according to claim 1, further including a storage configured to store corrected data obtained by correcting the optical data.

5. The particle detection apparatus according to claim 1, wherein the processor resets the applied voltage coefficient in accordance with the optical data of each of the plurality of optical detectors.

6. The particle detection apparatus according to claim 1, further including a storage configured to store the optical data with the applied voltage coefficients for each of the plurality of optical detectors.

7. The particle detection apparatus according to claim 1, wherein the particle is a particle to be analyzed, and the processor performs fluorescence separation processing by using optical data obtained from a single stain particle and corrected data by correcting the optical data of the particle to be analyzed.

8. The particle detection apparatus according to claim 7, wherein the fluorescence separation processing is performed by using corrected data by correcting the optical data of the single stain particle.

9. The particle detection apparatus according to claim 1, wherein each of the plurality of optical detectors detects light that have been emitted from the particle by irradiating excitation light with wavelengths different from each other.

10. The particle detection apparatus according to claim 1, wherein two or more of the plurality of optical detectors detect light emitted from the particle by irradiating the particle with excitation light of a same wavelength.

11. An information processing apparatus comprising:
a processor including a processing device and a memory storing instructions that, when executed by the processing device, cause the processor to:
correct optical data of light detected from a particle by a plurality of optical detectors, each of the plurality of optical detectors having a respective applied voltage coefficient, the correcting being in accordance with a difference between the respective applied voltage coefficients of the plurality of optical detectors and a predetermined applied voltage coefficient,
wherein at least one of the plurality of optical detectors has the applied voltage coefficient higher than a predetermined applied voltage coefficient of the plurality of optical detectors.

12. The information processing apparatus according to claim 11, wherein the particle is a single stain particle, and the processer performs fluorescence separation processing by using optical data obtained from a particle to be analyzed and corrected data by correcting the optical data of the single stain particle.

13. The information processing apparatus according to claim 12, wherein the optical data of the single stain particle is corrected so as to adjust to output levels of the particle to be analyzed detected at the predetermined applied voltage coefficients.

14. The information processing apparatus according to claim 12, the fluorescence separation processing is performed by using corrected data by correcting the optical data of the particle to be analyzed.

15. An information processing method comprising:
correcting optical data of light detected from a particle by a plurality of optical detectors, each of the plurality of optical detectors having a respective applied voltage coefficient, the correcting being in accordance with a difference between the respective applied voltage coefficients of the plurality of optical detectors and a predetermined applied voltage coefficient,
wherein at least one of the plurality of optical detectors has the applied voltage coefficient higher than a predetermined applied voltage coefficient of the plurality of optical detectors.

16. A particle detection method comprising:
detecting light from a particle with a plurality of optical detectors, each of the plurality of optical detectors having a respective applied voltage coefficient, wherein at least one of the plurality of optical detectors has the applied voltage coefficient higher than a predetermined applied voltage coefficient of the plurality of optical detectors; and
correcting optical data obtained from the particle in accordance with a difference between the respective applied voltage coefficients of the plurality of optical detectors and a predetermined applied voltage coefficient.

* * * * *